Figure 1:
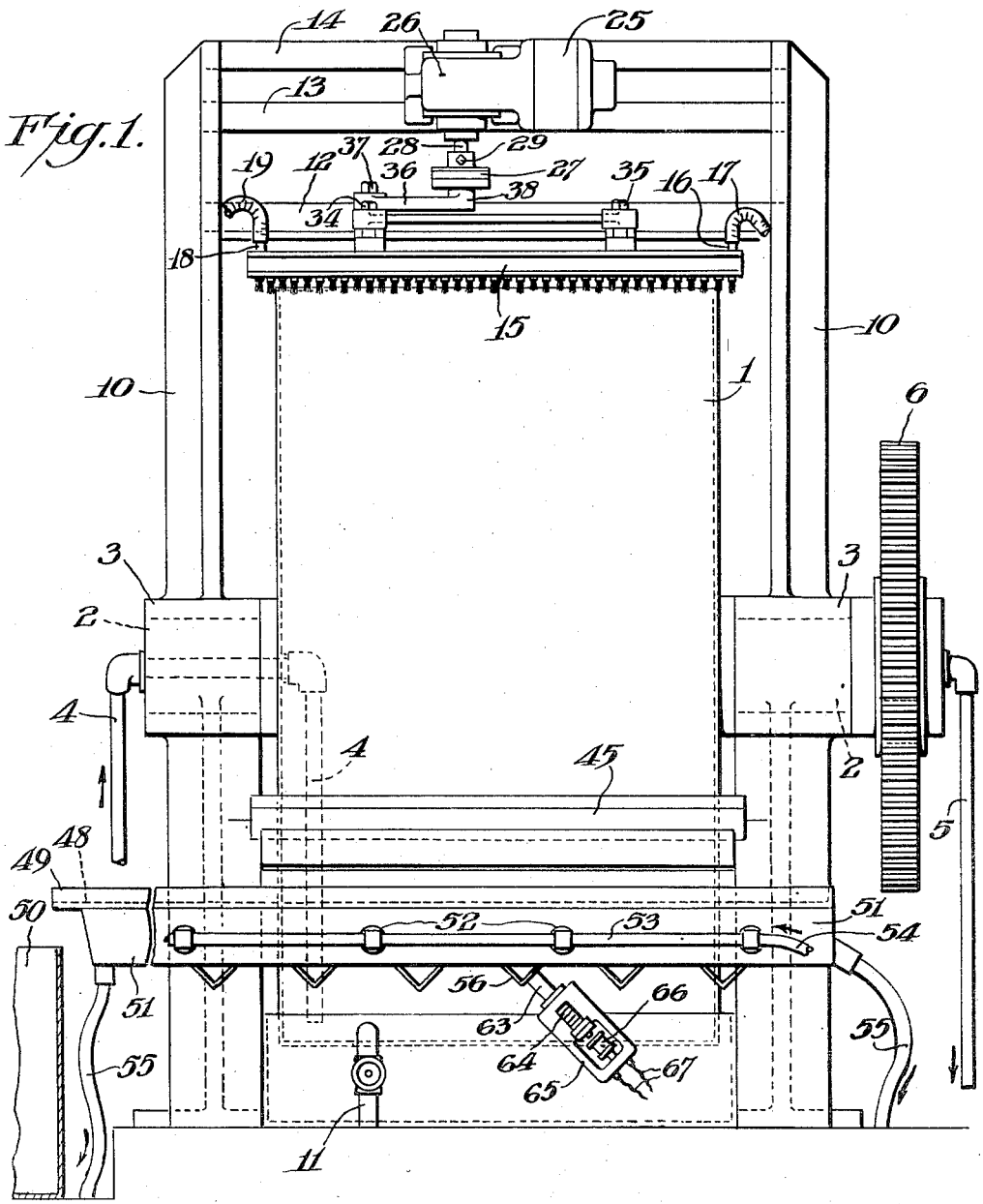

June 5, 1951 — H. A. BEAM — 2,555,309
FLAKING MACHINE AND METHOD
Filed May 7, 1947 — 3 Sheets-Sheet 1

INVENTOR.
Harry A. Beam
BY Walter C. Wheeler
ATTORNEY

June 5, 1951  H. A. BEAM  2,555,309
FLAKING MACHINE AND METHOD
Filed May 7, 1947  3 Sheets-Sheet 2
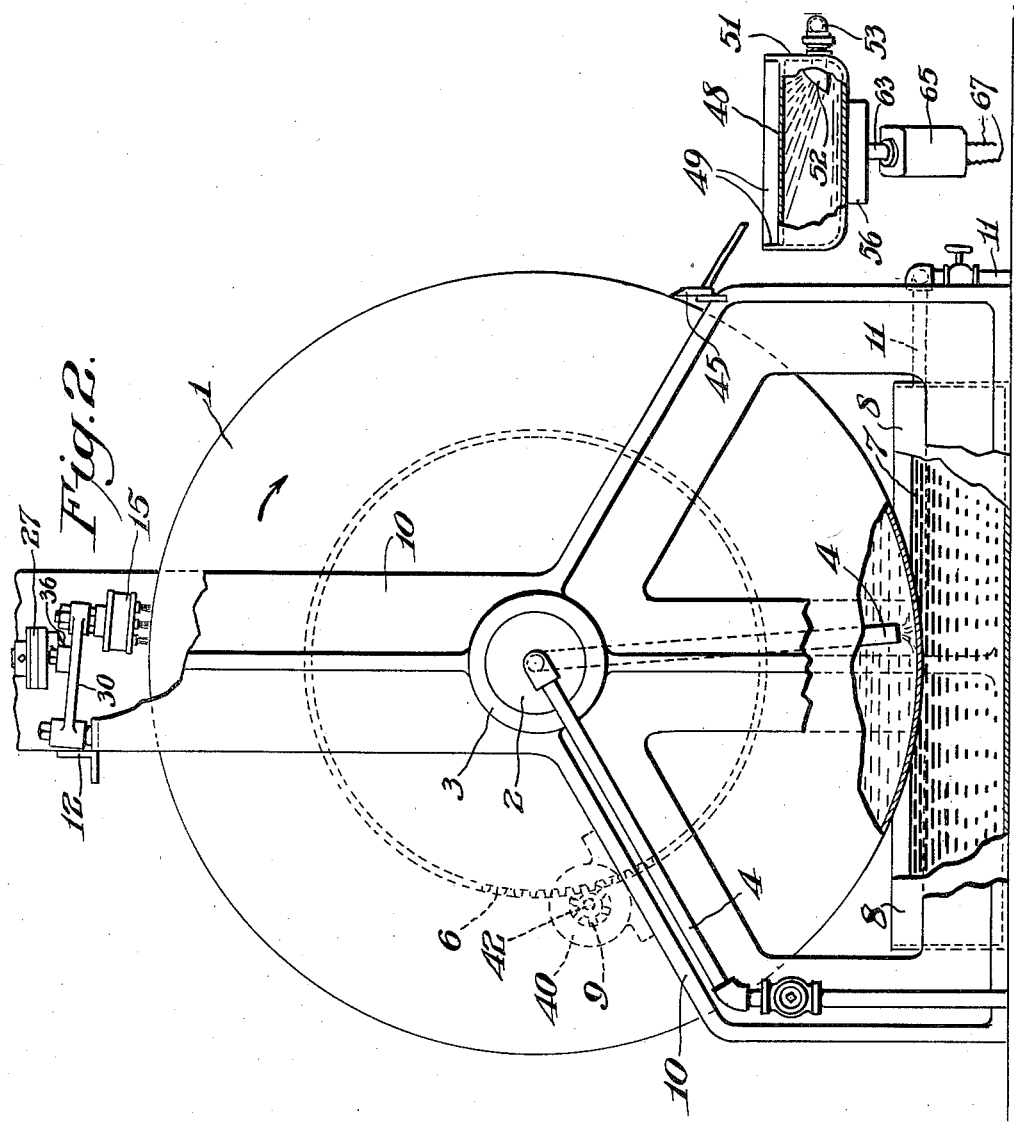
INVENTOR.
Harry A. Beam
BY
Walter C. Wheeler
ATTORNEY June 5, 1951 H. A. BEAM 2,555,309
FLAKING MACHINE AND METHOD
Filed May 7, 1947 3 Sheets-Sheet 3
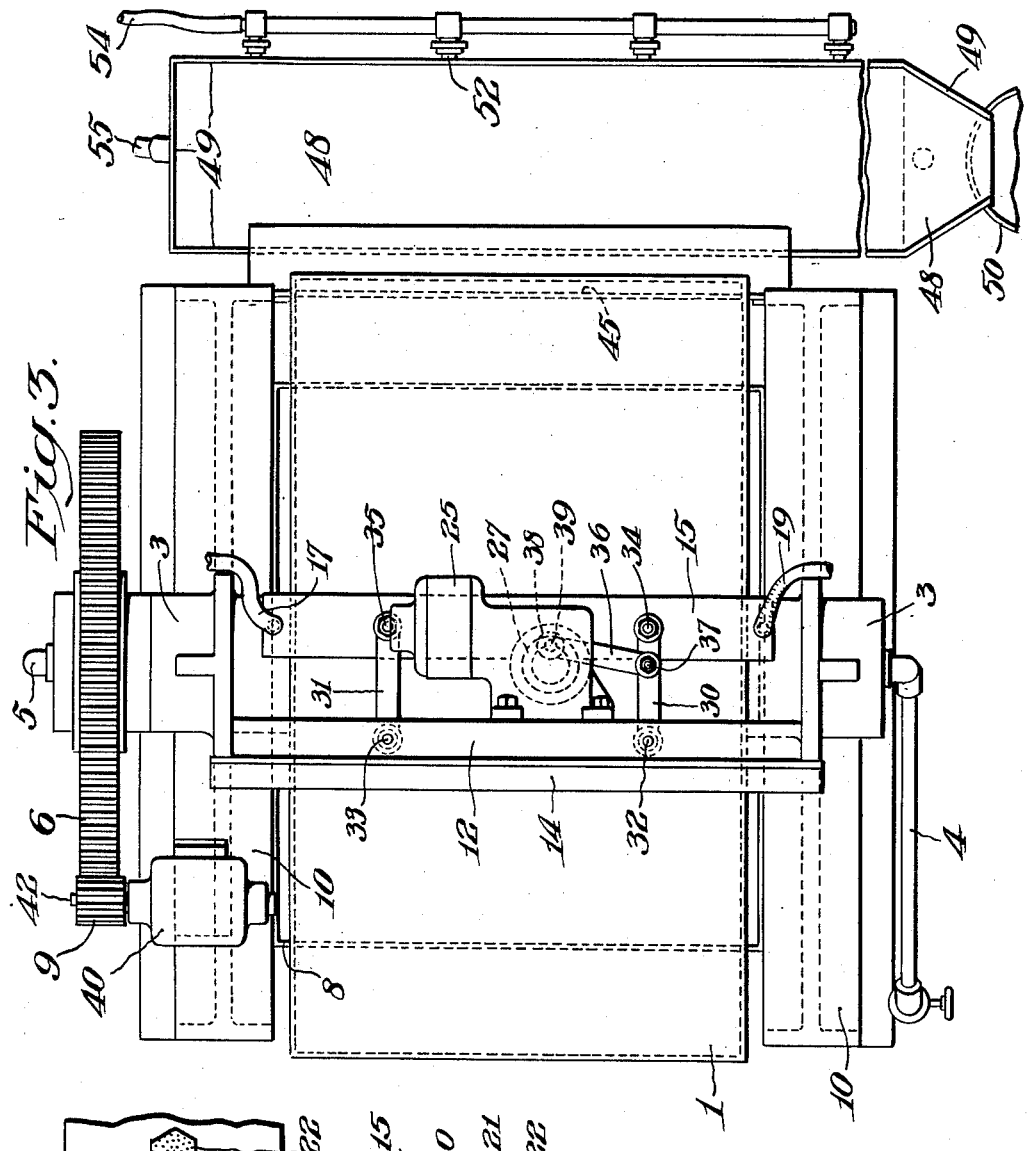
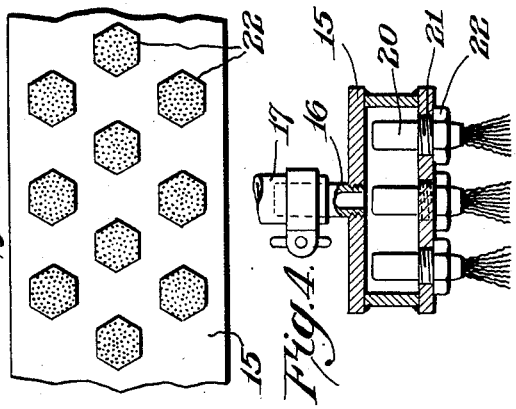
INVENTOR.
Harry A. Beam
BY
Walter C. Wheeler
ATTORNEY Patented June 5, 1951

2,555,309

UNITED STATES PATENT OFFICE 2,555,309

FLAKING MACHINE AND METHOD

Harry A. Beam, Wilmington, Del., assignor to E. I. du Pont de Nemours & Company, Wilmington, Del., a corporation of Delaware Application May 7, 1947, Serial No. 746,426

11 Claims. (Cl. 18—15)

This invention relates to methods and devices suitable for the continuous production of subdivided solid material from its supersaturated or fused form, and especially to such methods and devices which can be suitably regulated to produce the material directly in a relatively fine state of subdivision.

Heretofore the production of subdivided solids of many materials in desired relatively small sizes from their fluid forms has been accomplished by cooling and solidifying the material in the form of cakes and then breaking up the cakes or grinding the solids in suitably constructed mills. This is a laborious process at best. Many solid organic materials have wax-like properties and are difficult to disintegrate. The corrosive and toxic properties of others make such disintegrating processes hazardous and difficult to operate. Subdivision by spraying is also practiced but the apparatus for such an operation is sufficiently complicated to make its use undesirable on many materials. The physical properties of some organic materials make such processes prohibitive.

It is among the objects of the present invention to provide devices and methods for producing solids in subdivided form directly upon the solidification thereof from the fluid form. Other objects of the invention will be apparent from the following description which is made with reference to the drawings constituting a part hereof wherein Fig. 1 is a front elevational view of a flaking device of the rotatable drum type, Fig. 2 is a side elevational view of the device shown in Fig. 1 in which parts of the device are broken away, Fig. 3 is a top plan view of the device shown in Fig. 1, Fig. 4 is an end elevational view, with parts broken away of a suitable form of brushing device constituting a part of the apparatus, and Fig. 5 is a bottom plan view of the header showing an arrangement of bundles of attenuated members.

In general, the products of the present invention are made from a liquid or flowable state of the material or aggregate to be processed. The liquid, which may contain or be devoid of a solvent for the material, is brought into the form of a thin layer or film. The layer is progressively advanced and cooled to its set point. Thereupon the layer is subjected to agitation, whereupon a stressing, shearing action or tension is produced in the liquid film or layer and crystallization of the material is accelerated or induced whilst still being cooled. When the layer is sufficiently solidified, it is scraped or flaked from its support. As a modification of the process, the subdivided material which is scraped or flaked off from its support is cooled further in its subdivided state whilst proceeding across a surfaced support or platen which is reciprocated or vibrated and inclined so as to spread out the material into a layer or a number of streams of the subdivided material which advances across the support.

Referring to Fig. 1, the rotatable internally cooled flaking drum 1 is mounted to turn on hollow trunnions 2 in the bearings 3. The cooling fluid, such as cool water or brine, is supplied to the drum through cooling fluid supply pipe 4 which extends through one of the hollow trunnions and may terminate inside of the drum at a selected low point with reference to the trunnion. The cooling fluid is discharged through the other hollow trunnion and the discharge pipe 5. The pipes 4 and 5 may be suitably mounted in the hollow trunnion with stuffing boxes (not shown) so that the cooling fluid will not leak outside of the hollow trunnions.

The drum 1 is driven by the cog wheel 6 at a suitable speed. The drum 1 dips into the liquid material 7 in the trough 8 and upon the turning of the drum 1, a film or thin layer of the liquid material is produced thereon in the usual way. The driving cog wheel 6 is driven from a source of power through the pinion 9 which is mounted on the frame 10. The trough 8 is suitably attached to the frame so that the flaking drum 1 will dip into the liquid 7 which may be supplied to the trough through the supply pipe 11.

The means for setting up tension in the liquid comprises a brush-like device in which the attenuated members corresponding to the bristles of a brush are composed of material of good heat conductivity, such as metal, and are preferably composed of a stiff strong material having good heat conductivity, such as steel wire or piano wire. The brush-like device comprises a header 15 which is mounted to extend transversely across the face of the drum. The header is provided with an inlet nipple 16 for admitting heating fluid, such as steam which is supplied through a flexible connector or hose 17 which is connected to a suitable source of supply. An opposite end of the header is connected to a flexible connector 19 which may be connected to the sewer. The attenuated members or wires are mounted in the mouth of a cup shaped member as by swaging or welding them tightly in place or by other convenient means whereby they are secured in good heat conductive relationship to the cup shaped mount 20. An enlargement 21 of the cup shaped mount is threaded and screwed into tapped holes in the side of the header 15 which is mounted to face the drum 1. Lock nuts 22 are screwed onto the outer ends of the cup shaped member 20 so that when the level of the ends of the brush members is properly adjusted by screwing the cup shaped member the desired distance into the side of the header, they are secured in place by screwing the lock nuts 22 against the outer surface of the header.

Other forms of devices which dip into the moving layer and stress the liquid material may sometimes be used, instead of the wire brush-like device particularly illustrated in the drawings, such as a bar which extends across the face of the drum and dips into the liquid layer. However, for the solidification and flaking of materials which are difficult to solidify and disintegrate, the brush-like device gives satisfactory results. A preferred form of a heated brush-like stressing member is illustrated in Figs. 4 and 5 which comprises the cup-shaped mounts 20 for the attenuated members. This form of mount not only serves the purpose of a suitable receptacle to securely retain the attenuated heat conductive members, but it also provides an excellent means of controlling and confining the heat where it is needed without unduly dissipating it into the cooling layer of the material to be solidified. The cup-shaped mounts 20 are extended into the steam space where they present a relatively large heating surface to the heating fluid. With such an abundant interface presented to the heating means, a high rate of heat supply in desired quantity may be readily brought to the tips of the attenuated elements where it is used for preventing the accumulation of solids. This type of interface provides an excellent means for readily regulating the quantity of heat to be supplied to the desired point in unit time without employing an unduly high temperature level.

The heat conductive attenuated members may be disposed so that there will be no break or unbristled spaces in the face of the brush, but a desirable construction is that shown in Figs. 4 and 5 wherein the attenuated members are mounted in bundles and the bundles are regularly spaced apart in staggered relation. In normal operation, the attenuated members or brush-like structure is heated just sufficiently to prevent the accumulation of solid material on the members and more or less regulation of the heating means is required to compensate for changes in the nature of the material and other factors of operation. When the attenuated members are collected in bundles and arranged in staggered relation, the header and brush-like members are desirably reciprocated so that the area covered by the ends of adjacent bundles of attenuated members will overlap. This reciprocating action of the brush-like member is desirable whether the attenuated members are arranged in spaced bundles or whether their ends are contiguous, in that the film in which the ends of the members dip is stressed additionally by the sidewise action. The effect of the reciprocation is to effect zigzag paths of stress by the attenuated members dipping into the film as it is carried by the drum 1 on its surface under the header. While it is not essential to the operability of the process that the brush-like structure be reciprocated, the reciprocation is desirable in that it increases the effective periphery of the drum and the ultimate moment or stress set-up in the film of material.

For reciprocation, a desirable mounting comprises the driving motor 25 which is suitably mounted by attaching it to the cross beams 13 and 14 of the frame 10. A reducing gear in the housing 26 is driven by the motor and a coupling 27 is attached to the rotatable shaft 28 of the reducing gear by the set screw 29. The header 15 is supported from the transverse I-beam 12 of the frame by two spaced arms 30 and 31 which are mounted to turn at their ends about the mounting bolts 32 and 33 on the I-beam 12. The arms 30 and 31 of equal length are rotatably attached to bolts 34 and 35 on the header 15 so as to form a parallelogram with the fixed beam 12 and header 15. A crank 36 is pivotally attached at one of its ends by the bolt 37 to the arm 30 at a point between its ends. The other end of the arm 36 is provided with a bearing 38 and it operates on a stub shaft 39 on the coupling 27 which stub shaft is located eccentric to the shaft 28. Upon operating the motor, the coupling is turned and it operates on the arms 36 and 30 to reciprocate the freely movable element of the parallelogram formed by the fixed I-beam 12, the parallel arms 30 and 31, and the header 15. The flexible connections 17 and 19 freely permit this reciprocating movement.

The drum is rotated by the driving motor 40 mounted on the frame 10 through the pinion 9 which is keyed to the driven shaft 42 of the motor 40 (Fig. 2). As illustrative of the operation of the device material to be flaked, such as phenyl alpha naphthylamine, is fed to the pan 8 in fused condition through the supply pipe 11. The temperature of this material was only a fraction of a degree above its melting point (70° C.). This material is difficult to solidify and subdivide in that it tends to remain liquid or tar-like even when cooled below its set point and it tends to form a waxy solid which is difficult to disintegrate when it solidifies. A four foot outside diameter 30-inch wide flaking drum was rotated at the rate of 2½ revolutions per minute and cooling water at about 25° C. was supplied to the inside of the drum at a rate such that it was discharged at 34° C. while cooling the fused material. A thin layer of the material to be flaked was thus picked up on the surface of the drum. Then a brush-like device such as that illustrated in Figs. 4 and 5 and extending across the drum was located to agitate, plough through or brush through the film of fused material carried on the surface of the drum at the point where the material was cooled to its set point temperature. The agitating element was 7 inches wide and the tufts of brushing elements were set on centers one inch apart so that the horizontal line of attenuated elements extended sufficiently beyond the edges of the drum so that upon a reciprocating movement adjacent brushes will be displaced a distance sufficient to pass through all of the layer of fused material, say a displacement equal to the distance between centers of the tufts of wires which flare out to a diameter of about ½ inch and leave a space between bristles of about ½ inch. This reciprocation of the agitator was produced by rotating the wheel 27 at 500 revolutions per minute. The tufts of brushing agitators were made of about 40 strands of 0.02-inch diameter steel piano wire, machined off at their ends parallel to the face of the header 15 so the ends of all the brushes were in the same plane. The ends of the brushes were spaced from the surface of the drum so that they ploughed through the layer of material and cleared the surface of the drum by about 0.002 of an inch while the temperature of the material in the trough was such that the layer of material progressively picked up by the rotating drum was considerably thicker than .002 of an inch. The temperature of the material was kept constant for any given adjustment of the cooling rate, drum speed and location of the film stressing element, but the same regulation is possible by varying the temperature of the material in the trough 8, in that an increase of temperature of a liquid which becomes more fluid at higher temperatures will produce a thinner film on a drum running at constant speed than when the material is cooler and more viscous. The thinner film may require a readjustment in the spacing of the stressing element from the face of the drum or in its peripheral position, but the cooling of the thinner solidified film on the drum will be somewhat greater for a given repose thereon and in many cases will contribute to the facility of disintegration when the material is removed or scraped from the drum.

This contact, ploughing through or stressing of the film of material at the set point temperature causes a small build-up of solid material on the attenuated elements which, if allowed to continue would result in an undesirable obstruction and balling up of the material at the brushes. This action is prevented by heating the attenuated elements just sufficiently to prevent the accumulation of solid material on the brushes. When only enough steam or other suitable heating fluid is passed through the chest of the brush support 15 to heat the brushes so that this accumulation does not occur, there appears to be no material difference in the area of solidification of the material on the drum.

In the case of the treatment of phenyl alpha naphthylamine, the film solidifies almost immediately after leaving the edge of the stressing element. Then during the travel of the solidifying film to the contact edge of the doctor knife 45 or other scraper, the film continues to cool. The film of solidified material may be removed from the surface of the drum by any means which will disengage it, but a scraping contact member is preferred, such as a doctor knife. In the case of phenyl alpha naphthylamine, the solidified material is scraped off by means of a sharpened doctor knife 45 in the form of very small thin flakes which are of a size and thickness suitable for use, such as for incorporation in rubber is preferably but not necessarily set near the surface of the material mixtures by malaxation. The doctor knife is preferably but not necessarily set near the surface of the material in the trough 8 so that as much as possible of the cooling and adjustment of the crystallization can take place before it is removed.

By operating the same material in the manner described above except that the brushing or stressing of the film was omitted, the phenyl alpha naphthylamine did not solidify when the film reached the doctor knife 45, although the temperature of the film was lower than the set point.

In another operation in which brine was used to cool the drum, the phenyl alpha naphthylamine became cooled to a temperature below its set point at a time considerably before the film reached the brushes and was stressed. In that case, the phenyl alpha naphthylamine did not solidify although the stressing operation was applied to the film. It has been found that the film stressing or agitating device should preferably be applied to the film when it is cooled to the temperature of the set point, but that a tolerance of about one second is permissible after the set point temperature is reached before stressing the film. However, the cooling of the film to the set point temperature must take place just before the film is stressed or while the stressing is taking place, and in the specification and claims the references to agitating, brushing or stressing of the film at about the temperature of the set point refers to the application of such stress while the film is cooled to such temperature and to the application of such stress within about one second after the film is cooled to such temperature.

For many materials, the flaking or disintegration produced by the removal of the film with a doctor knife such as the doctor knife 45 is wholly satisfactory for packaging the material, but for some materials which are especially difficult to solidify into non-cohesive particles or flakes it is desirable to apply additional treatment in order to render the product satisfactory for packaging.

For this purpose, a vibrating cooling deck is provided to receive the material when it leaves the doctor knife 45. A preferred form of such a deck is indicated in the drawings wherein a plane surfaced rectangular cooling deck 48 having a rim 49 extending around three sides and rimless on the fourth side at the end where the material discharges into a container 50. The deck 48 is constructed as the top of a trough shaped cooler 51 which has mounted along the outer side a series of spray nozzles 52 which are directed to immerse the lower face of the pan 48. Cooling water is supplied to the nozzles 52 through the pipe 53 which is connected to a source of cooling water through the flexible connector 54. The discharge of cooling water is through the flexible connections 55 at both ends of the trough which drain the water from the bottom of the trough 51. The trough 51 is supported on the bed plate 56 which is swingingly supported on four suspension rods or bolts 57. Pins 58 on the trough are engaged by the lower ends of the bolts 56 and the bolts are held at their upper ends by the nuts 59 which act as locking nuts. The nuts 59 screw down on members 60 mounted on the upper surface of the horizontal frame member 61. The uprights 62 of the frame are attached to a bed plate (not shown). The cooling deck has a transverse abutment 56 to which a solenoid operated vibrator is attached. The vibrator comprises an anchored obliquely disposed reciprocating rod 63 which is biased against the spring 64 in mounting 65. The solenoid mounting 65 is fixedly anchored so that when the solenoid 66 is operated to push the rod 63 against the spring 64, the tray 48 will be moved in the same direction. At the end of the stroke of the solenoid armature of solenoid 66 and the de-energizing thereof, the spring 64 returns the tray to its normal position. The solenoid is energized through connections 67 which are connected to a suitable current source through a current interrupter (not shown). In operation, the spring 64 is adjusted so that the tray will be given a quick impulse in one direction and a slower return movement. This causes the subdivided material resting on the plate 48 to advance toward the open end of the tray slightly during every cycle of the vibrator. In this manner, additional time for cooling and hardening of the subdivided solid is allowed so that upon packing a subdivided difficultly hardenable material will not easily agglomerate. A suitable operation of a device of the kind may consist of a quick movement in the direction of the open end of the plane tray 48 and a slower return in the opposite direction. The frequency varies with materials of different sizes and specific gravities but a suitable frequency is one which will cause the material to move at the rate of about 6 inches to 1 foot per minute. Such a travel over a plate which is given such horizontal and vertical impulses whilst being cooled, produces a considerable hardness in the particles and lack of cohesion.

It will be evident from the foregoing description that considerable variation in the various operating features of the device can be made without departing from the invention and it is to be understood in construing the claims hereof that the invention is not to be restricted to the specific illustrations hereinabove set forth unless a restriction is specifically set forth.

I claim:

1. The method of flaking a material which upon cooling readily forms a supercooled liquid which comprises progressively forming on an advancing support a liquid film of said material which is at a higher temperature than its set point, progressively advancing said support as fast as said film is formed thereon and cooling the material during said advance, spacing a film engaging means from the surface of the support so that it will progressively engage a transverse section of the advancing liquid film of material which is cooled to about the temperature of its set point but is still in liquid form, moving said means relative to said film in such manner as to agitate the liquid throughout its mass in said section, continuing to advance the film on the cooled surface after the liquid is agitated and solidification is effected; and then removing the cooled solid film from said support.

2. The method of producing subdivision and solidification of liquefied material which upon cooling readily forms a supercooled liquid which comprises progressively forming on an advancing support a film of the liquefied material which is heated to a temperature above its set point, progressively advancing said support as fast as said film is formed thereon and cooling the material during said advance, locating a brushing means transversely across the advancing film with the ends of its attenuated elements spaced from the surface of the support and with the ends of said elements dipping into the moving film of material in an area of the film which has been cooled about to the set point temperature thereof but which is still in liquid form, moving said means relative to said film so as to agitate and apply stressing forces throughout the mass of said area of the liquid film which is cooled to said temperature, continuing said advancing of the material until the material is sufficiently friable to be broken in subdivided parts from the supporting surface, and then removing the material from the surface of said support in subdivided form.

3. The process in accordance with claim 2 in which the brushing device is reciprocated across the direction of travel of the support.

4. The process in accordance with claim 2 in which the attenuated elements are heated sufficiently to prevent the accumulation of solidified material thereon.

5. The process in accordance with claim 2 in which the material is scraped from the surface of the support.

6. In a rotary drum type flaking device, a rotating drum, means for continuously forming a layer of liquid material to be solidified on the outer surface of the drum, means to cool the drum to a temperature below the set point temperature of the material, and means for stressing the layer of material in an area on the support where the material is cooled about to the set point temperature of the material, said stressing means comprising a header, mounts in one surface of the header carrying a multiplicity of strong, stiff, heat conductive attenuated elements having their outer ends in a plane which is spaced from the surface of said drum but sufficiently near said surface to engage said layer of material as it is continuously advanced past said header, and means for heating said attenuated elements sufficiently to prevent solidified accumulation of said material thereon.

7. A device in accordance with claim 6 in which the mounts carrying the attenuated elements and mounted in one face of the header are elongated to project into the enclosure of the header to provide a heating surface for the reception of heat and a heat conductive body for conducting heat to the attenuated elements.

8. A device in accordance with claim 6 in which the mounts carrying the attenuated elements are spaced apart so that spaces remain between the tufts of such elements, and means is connected to the header for reciprocating the header across the direction of travel of the drum a distance at least equal to the distance between the centers of the tufts, whereby the attenuated elements trace a zig-zag path through the advancing layer of fluid material.

9. A device in accordance with claim 6 in which the mounts carrying the attenuated elements are spaced apart and means is connected to the header for reciprocating the header across the direction of travel of the drum.

10. A device for producing a solidified material from a heated fused material which upon cooling readily forms a supercooled liquid which comprises a continuously advancing support for supporting a fused layer of the material, means for advancing said support, means for progressively forming a layer of heated fused material on said support, means for continuously and progressively cooling the support and the layer of fused material disposed thereon to a temperature below the set point temperature of the material while advancing the same, means for removing solidified cooled material from the advancing support, and means for agitating and applying stressing forces throughout the mass of a transverse section of the advancing liquid film where the film is fused but is cooled about to its set point temperature for inducing solidification of the fused material, said agitating means being spaced from the advancing support within the area of said transverse section and within such close proximity to the support that said section of the fused cooled film is agitated throughout the mass of said entire section.

11. The method of producing flakes of a material characterized by readily forming a supercooled liquid upon cooling from the molten state and solidifying very slowly if cooled too far below the solidification point, which comprises forming the material in a molten state into a broad thin film of uniform thickness throughout its width, moving said film through a cooling zone whereby said film is progressively cooled, continuously and rapidly stressing said moving film across the full width thereof at that place along said moving film where the material has been cooled approximately to its solidification point thereby to initiate solidification of said moving film, permitting said moving film to continue solidification, and thereafter breaking up the solidified film into flakes.

HARRY A. BEAM.

REFERENCES CITED

The following references are of record in the file of this patent:

UNITED STATES PATENTS

| Number | Name | Date |
| --- | --- | --- |
| 1,235,716 | Mooney | Aug. 7, 1917 |
| 1,327,354 | Perry | Jan. 6, 1920 |
| 1,445,004 | Cowles | Feb. 13, 1923 |
| 1,883,112 | Tiers | Oct. 18, 1932 |
| 2,118,438 | Lawrence | May 24, 1938 |